US011388157B2

(12) United States Patent
Howard et al.

(10) Patent No.: US 11,388,157 B2
(45) Date of Patent: Jul. 12, 2022

(54) MULTI-FACTOR AUTHENTICATION OF INTERNET OF THINGS DEVICES

(71) Applicant: International Business Machines Corporation, Armonk, NY (US)

(72) Inventors: Gina Renee Howard, Hillsborough, NC (US); Charles Steven Lingafelt, Durham, NC (US); John E. Moore, Jr., Pflugerville, TX (US); Andrew R. Jones, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 17/076,037

(22) Filed: Oct. 21, 2020

(65) Prior Publication Data

US 2022/0124080 A1 Apr. 21, 2022

(51) Int. Cl.
*H04L 9/40* (2022.01)
(52) U.S. Cl.
CPC ................................... *H04L 63/08* (2013.01)
(58) Field of Classification Search
CPC ........................................................ H04L 63/08
USPC ............................................................... 726/7
See application file for complete search history.

(56) References Cited

U.S. PATENT DOCUMENTS

| 10,015,154 | B2 | 7/2018 | Tunnell et al. |
| 10,735,966 | B2* | 8/2020 | Wu .......................... H04L 67/34 |
| 2005/0280546 | A1 | 12/2005 | Ganley et al. |
| 2011/0086632 | A1 | 4/2011 | Tumey et al. |

(Continued)

FOREIGN PATENT DOCUMENTS

| CN | 108632231 A | 10/2018 |
| CN | 109981543 A | 7/2019 |

OTHER PUBLICATIONS

Challenges of Multi-Factor Authentication for Securing Advanced IoT (A-IoT) Applications Aleksandr Ometov, Vitaly Petrov, Sergey Bezzateev, Sergey Andreev, Yevgeni Koucheryavy, and Mario Gerla Jan. 21, 2019 IEEE (Year: 2019).*

(Continued)

*Primary Examiner* — Benjamin A Kaplan
(74) *Attorney, Agent, or Firm* — Robert A. Voigt, Jr.; Shakelford, Bowen, McKinley & Norton, LLP

(57) ABSTRACT

A computer-implemented method, system and computer program product for utilizing multi-factor authentication to authenticate an Internet of Things (IoT) device. The identity credentials of neighboring IoT device(s) are obtained by the IoT device to be authenticated. Upon providing a request to the authentication system to prove its identity, the IoT device provides the authentication system a first factor credential, such as a username and password. The authentication system, upon confirming the accuracy of the first factor credential, challenges the IoT device to provide the second factor credential. After receiving the challenge from the authentication system to provide the second factor credential, the IoT device returns the second factor credential that was generated based on the obtained identity credentials from the neighboring IoT device(s). Upon determining that the received second factor credential includes the identity credentials from the minimum number of required neighboring IoT devices, the authentication system approves authentication.

20 Claims, 5 Drawing Sheets

(56) References Cited

U.S. PATENT DOCUMENTS

| | | |
|---|---|---|
| 2011/0314539 A1 | 12/2011 | Horton |
| 2014/0279558 A1 | 9/2014 | Kadi et al. |
| 2016/0337863 A1 | 11/2016 | Robinson et al. |
| 2016/0352732 A1 | 12/2016 | Bamasag et al. |
| 2018/0288617 A1* | 10/2018 | Robison .................. H04L 67/12 |
| 2019/0058586 A1* | 2/2019 | Kumar .................... H04L 67/34 |
| 2019/0230063 A1 | 7/2019 | McCready et al. |
| 2020/0013051 A1 | 1/2020 | Kadiwala et al. |
| 2020/0099693 A1 | 3/2020 | Khosravi et al. |

OTHER PUBLICATIONS

Two-Factor Authentication for IoT With Location Information Muhammad Naveed Aman, Member, IEEE, Mohamed Haroon Basheer, Student Member, IEEE, and Biplab Sikdar, Senior Member, IEEE IEEE Internet of Things Journal, vol. 6, No. 2, Apr. 2019 (Year: 2019).*

Ryan Lee, "Announcing Multi-Factor Authentication for IoT and Global Dash Cellular Board," https://www.hologram.io/blog/announcing-multi-factor-authentication-for-iot-and-global-dash-cellular-board, Jan. 7, 2018, pp. 1-6.

Aman et al., "Two-Factor Authentication for IoT with Location Information," IEEE Internet of Things Journal, 2018, pp. 1-16.

Notification of Transmittal of the International Search Report and the Written Opinion of the International Searching Authority for International Application No. PCT/CN2021/125361 dated Dec. 29, 2021, pp. 1-9.

* cited by examiner

MULTI-FACTOR AUTHENTICATION OF INTERNET OF THINGS DEVICES

TECHNICAL FIELD

The present disclosure relates generally to information security, and more particularly to utilizing multi-factor authentication to authenticate an Internet of Things (IoT) device by utilizing identity credentials from neighboring IoT device(s) to generate the second factor credential.

BACKGROUND

Information security, sometimes shortened to infosec, is the practice of protecting information by mitigating information risks. For example, information security, which is part of information risk management, attempts to prevent or at least reduce the probability of unauthorized/inappropriate access to data, or the unlawful use, disclosure, disruption, deletion, corruption, modification, inspection, recording or devaluation of information. It also involves actions intended to reduce the adverse impacts of such incidents.

One technique for providing information security is via multi-factor authentication, which is an electronic authentication method in which, for example, a computer user may be granted access to a website or application only after successfully presenting two or more pieces of evidence (or factors) to an authentication mechanism: knowledge (something the user and only the user knows), possession (something the user and only the user has), and inherence (something the user and only the user is). It protects the user from an unknown person trying to access their data, such as personal identifier details or financial assets.

Two-factor authentication (also known as 2FA) is a type, or subset, of multi-factor authentication. It is a method of confirming users' claimed identities by using a combination of two different factors: 1) something they know, 2) something they have, or 3) something they are. A third-party authenticator (TPA) application may enable two-factor authentication, usually by showing a randomly-generated and constantly refreshing code which the user can use.

While multi-factor authentication has been used to protect information in terms of attempting to only grant access to a website or application by an authenticated computer user, there has not been any major development in protecting information stored among Internet of Things (IoT) devices.

SUMMARY

In one embodiment of the present disclosure, a computer-implemented method for utilizing multi-factor authentication to authenticate an Internet of Things (IoT) device comprises obtaining identity credentials from one or more other IoT devices by the IoT device during a period of time to generate a second factor credential. The method further comprises providing a request to an authentication system to prove an identity of the IoT device. The method additionally comprises providing a first factor credential to the authentication system. Furthermore, the method comprises receiving a challenge from the authentication system to provide the second factor credential. Additionally, the method comprises returning the second factor credential generated based on the obtained identified credentials from the one or more other IoT devices. In addition, the method comprises receiving an indication from the authentication system that the IoT device has proved the identity of the IoT device in response to the second factor credential containing a minimum number of required identity credentials.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
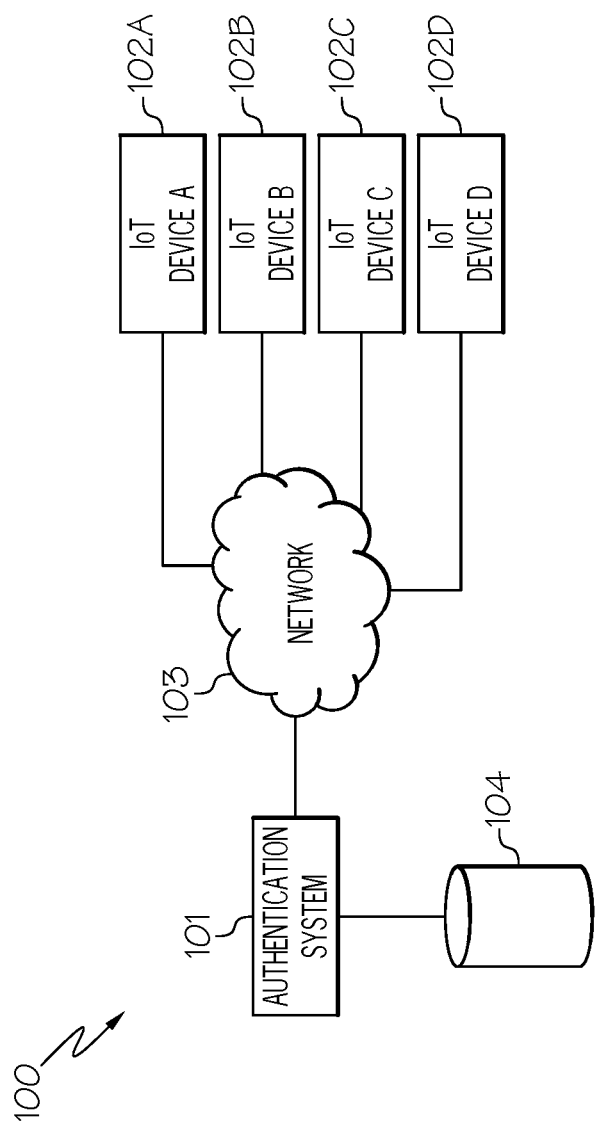
FIG. 1 illustrates an Internet of Things (IoT) environment for practicing the principles of the present disclosure in accordance with an embodiment of the present disclosure.

As stated in the Background section, information security, sometimes shortened to infosec, is the practice of protecting information by mitigating information risks. For example, information security, which is part of information risk management, attempts to prevent or at least reduce the probability of unauthorized/inappropriate access to data, or the unlawful use, disclosure, disruption, deletion, corruption, modification, inspection, recording or devaluation of information. It also involves actions intended to reduce the adverse impacts of such incidents.

One technique for providing information security is via multi-factor authentication, which is an electronic authentication method in which a computer user may be granted access to a website or application only after successfully presenting two or more pieces of evidence (or factors) to an authentication mechanism: knowledge (something the user and only the user knows), possession (something the user and only the user has), and inherence (something the user and only the user is). It protects the user from an unknown person trying to access their data, such as personal identifier details or financial assets.

Two-factor authentication (also known as 2FA) is a type, or subset, of multi-factor authentication. It is a method of confirming users' claimed identities by using a combination of two different factors: 1) something they know, 2) something they have, or 3) something they are. A third-party authenticator (TPA) application may enable two-factor authentication, usually by showing a randomly-generated and constantly refreshing code which the user can use.

While multi-factor authentication has been used to protect information in terms of attempting to only grant access to a website or application by an authenticated computer user, there has not been any major development in protecting information stored among Internet of Things (IoT) devices.

An IoT device is a piece of hardware with a sensor that transmits data from one place to another over the Internet. Types of IoT devices include wireless sensors, software, actuators, and computer devices. For example, IoT devices may be utilized in the following areas: connected applicants, smart home security systems, autonomous farming equipment, wearable health monitors, smart factory equipment, wireless inventory trackers, ultra-high speed wireless Internet, biometric cybersecurity scanners and shipping container and logistics tracking.

Typically, in order to authenticate or prove the identity of an IoT device, the IoT device simply uses the traditional username and password, which is a single factor and does not provide the level of security as multi-factor authentication.

There have been, however, some recent developments in utilizing multi-factor authentication, to provide a greater level of security for the data stored on an IoT device. For example, the IoT device stores a secret key for generating a time-based password. An authenticated identification device may also have the same secret key. The IoT device establishes the secured connection with the identification device through the wireless network. Then the IoT device uses the secret key and a current access time to generate the time-based password, and receives a second time-based password from the identification device through the secured connection. If both time-based passwords match each other, the identification device is authenticated.

This approach is a similar approach to that used by RSA key fobs to provide a second factor. Unfortunately, such an approach is susceptible to unauthorized manipulation of the time source within the IoT device.

There is not currently a means for utilizing multi-factor authentication to authenticate an Internet of Things (IoT) device in a more secured manner than prior attempts.

The embodiments of the present disclosure provide a means for authenticating an IoT device utilizing multi-factor authentication in a more secured manner than prior attempts.

In some embodiments of the present disclosure, the present disclosure comprises a computer-implemented method, system and computer program product for utilizing multi-factor authentication to authenticate an Internet of Things (IoT) device. In one embodiment of the present disclosure, the identity credentials of neighboring IoT device(s) are obtained by the IoT device to be authenticated. Such identity credentials may be utilized to generate a second factor credential during a multi-factor authentication process. In one embodiment, during a trust state, such as when the IoT device and its neighboring IoT devices are installed, the authentication system pairs the IoT device with specified neighboring IoT devices to be in constant communication. The authentication system may require the second factor credential generated by the IoT device to be based on the identity credentials acquired from at least a minimum number of these neighboring IoT devices or acquired from specified IoT devices out of these neighboring IoT devices. In one embodiment, such identity credentials are obtained by the IoT device during a "neighbor observation period," which corresponds to a designated duration of time, which may occur periodically, such as at specified intervals of time. Upon providing a request to the authentication system to prove its identity, the IoT devices provides the authentication system a first factor credential, such as a username and password, which may be embedded within the IoT device. The authentication system, upon confirming the accuracy of the first factor credential, such as via a lookup table listing the username and passwords associated with the IoT device, challenges the IoT device to provide the second factor credential. After receiving the challenge from the authentication system to provide the second factor credential, the IoT device returns the second factor credential to the authentication system that was generated based upon the obtained identity credentials from the neighboring IoT device(s). Upon determining that the received second factor credential includes the identity credentials of specified neighboring IoT devices or a minimum number of specified neighboring IoT devices, the authentication system approves authentication. The IoT device then receives an indication from the authentication system that the IoT device has proved its identity. In this manner, the IoT device is authenticated utilizing multi-factor authentication in a more secured manner than prior attempts.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an Internet of Things (IoT) environment 100 for practicing the principles of the present disclosure in accordance with an embodiment of the present disclosure. IoT environment 100 includes an authentication system 101 connected to IoT devices 102A-102D (identified as "IoT Device A," "IoT Device B," "IoT Device C," and "IoT Device D," respectively, in FIG. 1) via a network 103. IoT devices 102 may collectively or individually be referred to as IoT devices 102 or IoT device 102, respectively.

Authentication system 101 is configured to authenticate or prove the identity of IoT device 102 without human interaction. In one embodiment, authentication system 101 requires multi-factor authentication beyond a simple username and password to authenticate or prove the identity of an IoT device 102. Examples of authentication systems that may be modified to authenticate IoT devices 102 without human interaction as discussed herein include HID DigitalPersona® and Duo Security by Cisco®. A description of the hardware configuration of authentication system 101 is provided further below in connection with FIG. 3.

In one embodiment, authentication system 101 is connected to a database 104 for storing identity credentials of registered IoT devices 102 as discussed further below.

In one embodiment, IoT device 102 is a piece of hardware with a sensor that transmits data from one place to another over the Internet. Types of IoT devices 102 include wireless sensors, software, actuators, and computer devices. For example, IoT devices 102 may be utilized in the following areas: connected applicants, smart home security systems, autonomous farming equipment, wearable health monitors, smart factory equipment, wireless inventory trackers, ultra-high speed wireless Internet, biometric cybersecurity scanners and shipping container and logistics tracking.

A description of the hardware configuration of an exemplary IoT device 102 is provided below in connection with FIG. 2.

Figure 2:
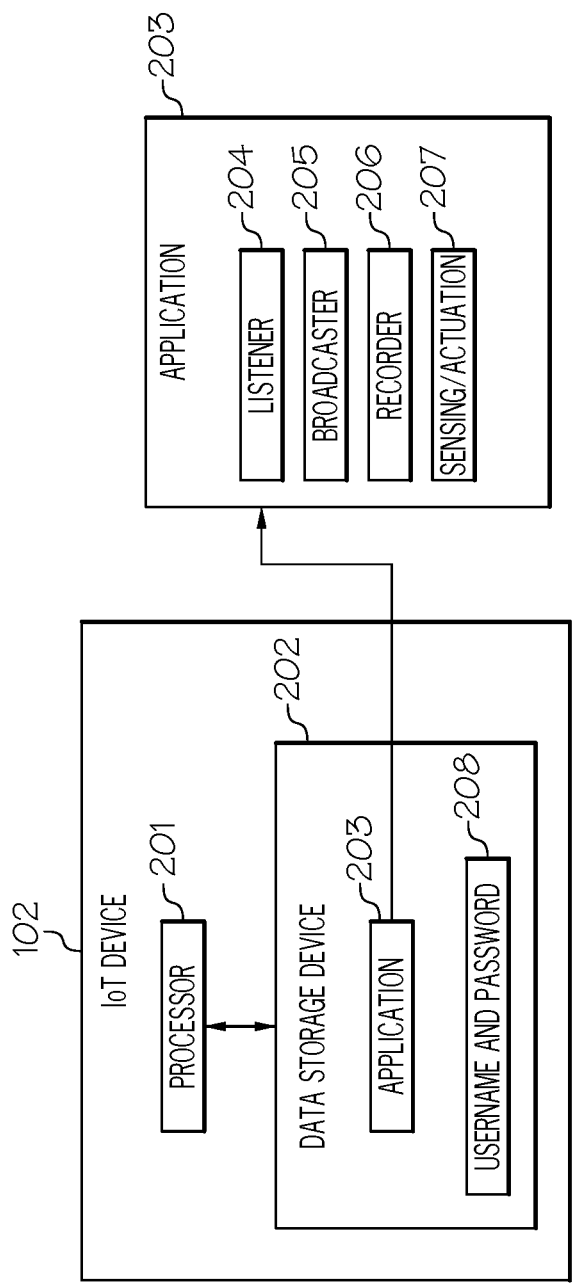
FIG. 2 illustrates an embodiment of the present disclosure of a hardware configuration of the IoT device.

FIG. 2 illustrates an embodiment of the present disclosure of the hardware configuration of IoT device 102 (FIG. 1) which is representative of a hardware environment for practicing the present disclosure.

Referring to FIG. 2, IoT device 102 includes a processor 201 and a data storage device 202 (e.g., magnetic storage device, optical storage device, flash memory device) that is enabled to host and run a software program or application 203, such as a lightweight application, and communicate with other IoT devices 102 and authentication system 101 via network 103 as shown in FIG. 1. A "lightweight application," as used herein, refers to a computer program that is designed to have a small memory footprint and low CPU usage thereby having an overall low usage of system resources. In one embodiment, the program instructions of application 203, including its components discussed herein, are executed by processor 201.

In one embodiment, application 203 may include various components, such as a listener 204, a broadcaster 205, a recorder 206, and a sensing/actuation component 207. In general, listener 204 serves to receive data or other input via network 103 (FIG. 1), while broadcaster 205 serves to broadcast data or other output via network 103. Recorder 206 serves to log data. Sensing/actuation component 207 undertakes sensing and actuation functions conventionally associated with IOT devices. Generally, sensing/actuation component 207 may serve to undertake sensing or measurement of ambient parameters, such as temperature, brightness, sound, etc., as may be appropriate in the context of the device.

In one embodiment, storage device 202 further includes the storage of the username and password 208, which is used as the first factor credential provided to authentication system 101 in connection with the multi-factor authentication technique discussed herein.

Returning to FIG. 1, network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Environment 100 is not to be limited in scope to any one particular network architecture. Environment 100 may include any number of authentication systems 101, IoT devices 102 and networks 103.

Figure 3:
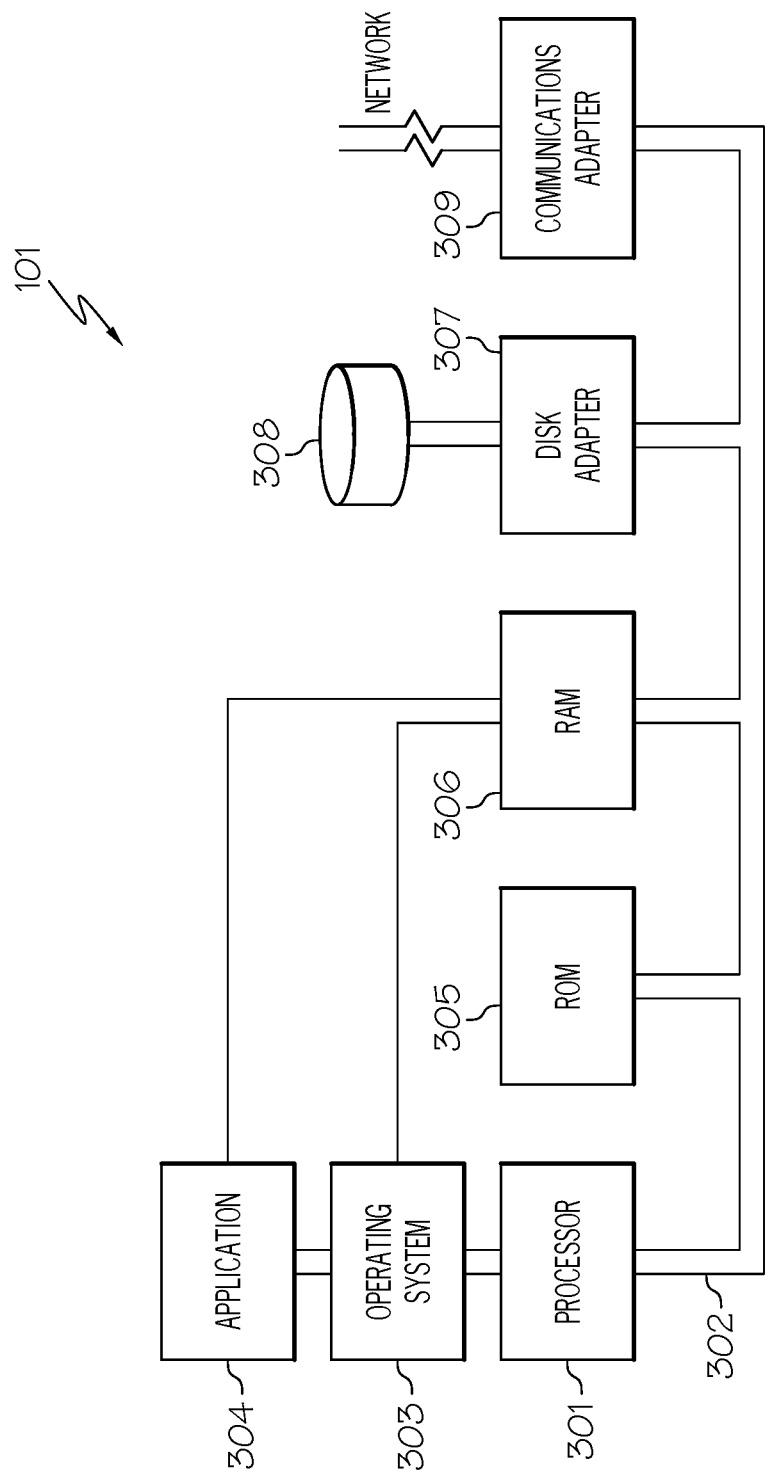
FIG. 3 illustrates an embodiment of the present disclosure of the hardware configuration of the authentication system which is representative of a hardware environment for practicing the present disclosure.

Referring now to FIG. 3, FIG. 3 illustrates an embodiment of the present disclosure of the hardware configuration of authentication system 101 (FIG. 1) which is representative of a hardware environment for practicing the present disclosure.

Authentication system 101 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, a program for utilizing multi-factor authentication to authenticate an IoT device 102 (FIG. 1) as discussed further below in connection with FIGS. 4-5.

Referring again to FIG. 3, read-only memory ("ROM") 305 is connected to system bus 302 and includes a basic input/output system ("BIOS") that controls certain basic functions of authentication system 101. Random access memory ("RAM") 306 and disk adapter 307 are also connected to system bus 302. It should be noted that software components including operating system 303 and application 304 may be loaded into RAM 306, which may be authentication system's 101 main memory for execution. Disk adapter 307 may be an integrated drive electronics ("IDE") adapter that communicates with a disk unit 308, e.g., disk drive. It is noted that the program for utilizing multi-factor authentication to authenticate an IoT device 102, as discussed further below in connection with FIGS. 4-5, may reside in disk unit 308 or in application 304.

Authentication system 101 may further include a communications adapter 309 connected to bus 302. Communications adapter 309 interconnects bus 302 with an outside network (e.g., network 103 of FIG. 1) to communicate with other devices, such as IoT devices 102.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, typically, in order to authenticate or prove the identity of an IoT device, the IoT device simply uses the traditional username and password, which is a single factor and does not provide the level of security as multi-factor authentication. There have been, however, some recent developments in utilizing multi-factor authentication, to provide a greater level of security for the data stored on an IoT device. For example, the IoT device stores a secret key for generating a time-based password. An authenticated identification device may also have the same secret key. The IoT device establishes the secured connection with the identification device through the wireless network. Then the IoT device uses the secret key and a current access time to generate the time-based password, and receives a second time-based password from the identification device through the secured connection. If both time-based passwords match each other, the identification device is authenticated. This approach is a similar approach to that used by RSA key fobs to provide a second factor. Unfortunately, such an approach is susceptible to unauthorized manipulation of the time source within the IoT device. There is not currently a means for utilizing multi-factor authentication to authenticate an Internet of Things (IoT) device in a more secured manner than prior attempts.

Figure 4:
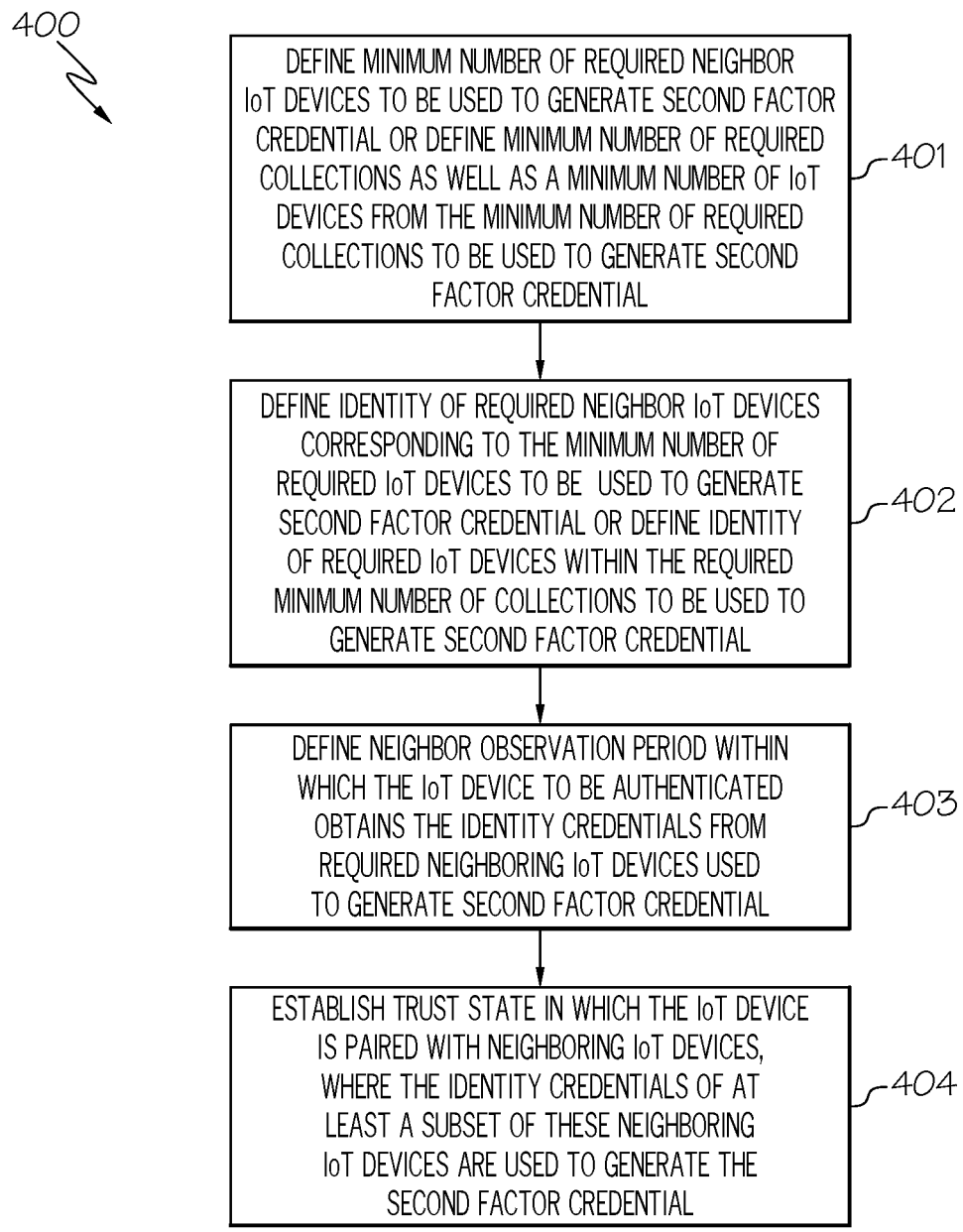
FIG. 4 is a flowchart of a method for establishing the requirements for generating a second factor credential by the IoT device in authenticating the IoT device during the setup phase in accordance with an embodiment of the present disclosure.
Figure 5:
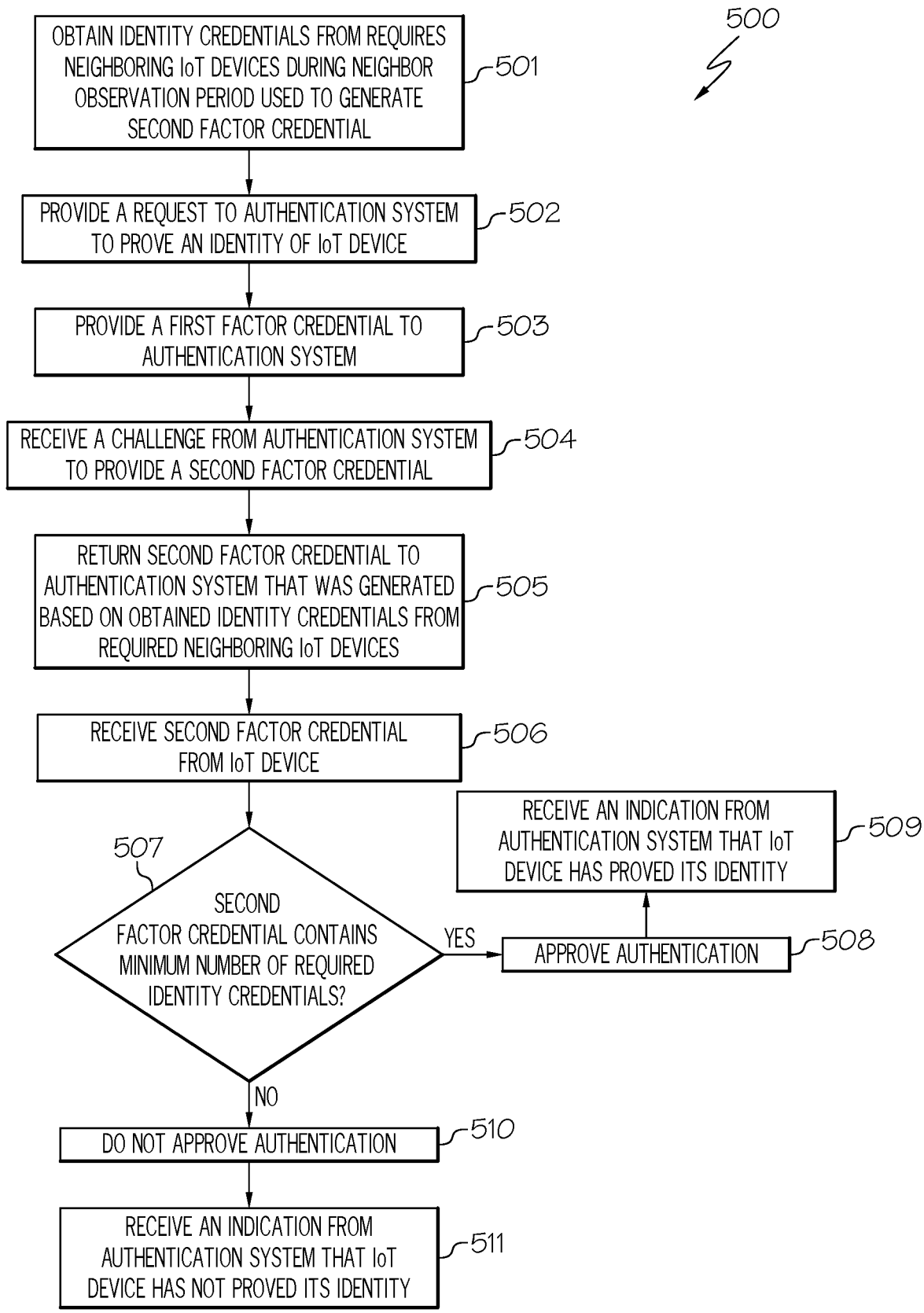
FIG. 5 is a flowchart of a method of an execution phase in authenticating the IoT device by the IoT device providing the authentication system a second factor credential using the identity credentials of a minimum number of required neighboring IoT devices in accordance with an embodiment of the present disclosure.

The embodiments of the present disclosure provide a means for authenticating an IoT device 102 (FIGS. 1 and 2) utilizing multi-factor authentication in a more secured manner than prior attempts using interactions with neighboring IoT devices 102 as discussed below in connection with FIGS. 4-5. FIG. 4 is a flowchart of a setup phase in establishing the requirements for generating a second factor credential by IoT device 102 in authenticating IoT device 102. FIG. 5 is a flowchart of an execution phase in authenticating IoT device 102 by IoT device 102 providing a second factor credential using the identity credentials of neighboring IoT devices 102.

FIG. 4 is a flowchart of a method 400 for establishing the requirements for generating a second factor credential by IoT device 102 in authenticating IoT device 102 during the setup phase in accordance with an embodiment of the present disclosure.

While the following description describes authentication system 101 utilizing a two-factor authentication to authenticate IoT device 102, authentication system 101 may utilize other multiple factors of authentication to authenticate IoT device 102, such as three-factor authentication. A person of ordinary skill in the art would be capable of applying the principles of the present disclosure to such implementations.

Further, embodiments applying the principles of the present disclosure to such implementations would fall within the scope of the present disclosure.

Referring to FIG. 4, in conjunction with FIGS. 1-3, authentication system 101 defines the minimum number of required neighbor IoT devices 102 to be used to generate the second factor credential or define the minimum number of required collections as well as the minimum number of IoT devices from the minimum number of required collections to be used to generate the second factor credential. A "neighbor" or "neighboring" IoT device 102 (e.g., IoT device 102B, IoT device 102C, IoT device 102D) to an IoT device 102 (e.g., IoT device 102A), as used herein, refers to those IoT devices 102 (e.g., IoT device 102B) that have been paired with IoT device 102 (e.g., IoT device 102A) during the trust state (discussed below). Furthermore, such "neighboring" IoT devices 102 are located close enough in proximity as to communicate, such as via network 103, with an IoT device 102 whose identity is to be authenticated. Such communications entail a request by an IoT device 102 (e.g., IoT device 102A), whose identity is to be authenticated, to obtain an identity credential from the neighboring IoT device 102 (e.g., IoT device 102B, IoT device 102C, IoT device 102D). An "identity credential," as used herein, refers to a security key, a digital signature or a characteristic of IoT device 102, such as, but not limited to sensor characteristics (e.g., electrochemical, gyroscope, pressure, light sensors, Global Positioning System (GPS), pressure, radio-frequency identification (RFID), etc.), strength of signal characteristics (e.g., −60 dBm, −75 dBm, etc.), signal modulation characteristics (e.g., 2.4 GHz Wi-Fi, 5 GHz Wi-Fi, Ethernet) and signal encoding characteristics (e.g., ASCII, HEX, etc.).

In one embodiment, neighboring IoT devices 102 are required to be registered with authentication system 101, such as during the trust state, which entails providing authentication system 101 such identity credentials. In one embodiment, such identity credentials may be provided to authentication system 101 periodically, such as during the neighbor observation period (discussed below) when IoT device 102 obtains the identity credentials of its neighboring IoT devices 102.

In one embodiment, these credentials are stored in a table, which may reside in a storage device (e.g., memory 305, disk drive 308). Such credentials may be associated with the particular IoT device 102 in the table, such as by an identifier of IoT device 102 (e.g., object identifier, such as a barcode, communication identifier, such as an Internet Protocol (IP) address, and application identifier, such as a uniform resource identifier (URI) and uniform resource locator (URL)). In an alternative embodiment, such identity credentials and associated IoT device identifiers may be stored in a database, such as database 104 connected to authentication system 101.

As discussed above, authentication system 101 defines the minimum number of required neighbor IoT devices 102 to be used to generate the second factor credential. For example, authentication system 101 may require that the IoT device 102 to be authenticated needs to utilize the identity credentials from a minimum number of three neighboring IoT devices (e.g., IoT device 102B, IoT device 102C, IoT device 102D) to generate the second factor credential in the two factor authentication technique of the present disclosure.

Furthermore, as discussed above, authentication system 101 defines the minimum number of required collections to be used to generate the second factor credential. A "collection," as used herein, refers to a set of neighboring IoT devices 102. For example, a collection ("A") may correspond to the set of {A, B, C, D, and E}, where A, B, C, D and E are each individual neighboring IoT devices 102. Authentication system 101 may define the minimum number of such collections that are to be used in generating the second factor credential by the IoT device 102 whose identity is to be authenticated. Furthermore, authentication system 101 may further define the minimum number of neighboring IoT devices from the minimum number of collections that are to be used in generating the second factor credential. For example, authentication system 101 may define a minimum number of three neighboring IoT devices from the minimum number of collections to generate the second factor credential in the two factor authentication technique of the present disclosure.

In step 402, authentication system 101 defines the identity of the required neighboring IoT devices 102 corresponding to the minimum number of required IoT devices 102 to be used to generate the second factor credential or defines the identity of the required IoT devices 102 within the required minimum number of collections to be used to generate the second factor credential.

For example, authentication system 101 may require that the IoT device 102 (e.g., IoT device 102A) to be authenticated to use the identity credentials of IoT device 102B, IoT device 102C and IoT device 102D to generate the second factor credential that corresponds to the required minimum number of three neighboring IoT devices 102 that are required to be used to generate the second factor credential. "Generating" the second factor credential, as used herein, refers to producing a credential that includes the required identity credentials of the neighboring IoT devices 102. "Generating," may be performed by appending an identifier (e.g., object identifier, such as a barcode, communication identifier, such as an Internet Protocol (IP) address, and application identifier, such as a uniform resource identifier (URI) and uniform resource locator (URL)) of neighboring IoT device 102 with its identity credential. As a result, the second factor credential may include a series of identifiers (identifiers of neighboring IoT devices 102) appended with its associated identity credential.

In one embodiment, such requirements are stored in a table (which may be stored in a storage medium (e.g., memory 305, disk drive 308) or in a database 104) associated with the IoT device 102 (e.g., IoT device 102A) to be authenticated. In this manner, authentication system 101 will be able to determine if the second factor credential received from the IoT device 102 to be authenticated is correct as authentication system 101 has access to the identity credential of each of the neighboring IoT devices 102 and will be able to construct the second factor credential using the identity credentials of those required neighboring IoT device 102 that are required to be used to generate the second factor credential. Furthermore, as discussed above, such identity credentials may be constantly updated, such as during the neighbor observation period (discussed further below), so that the identity credential are up-to-date.

In another example, authentication system 101 may require the IoT device 102 (e.g., IoT device 102A) to be authenticated to use the required minimum number of collections (e.g., three collections) that consists of the defined neighboring IoT devices 102. For instance, authentication system 101 may define the collection "R" to include the set of {A, B, C, D and E}, define the collection "S" to include the set of {A, B, E and F} and define the collection "T" to include the set of {A, E, I, O and U}, where each letter corresponds to a specific neighboring IoT device 102. The authentication requirement could be that at least 3 neighboring IoT devices 102 need to be used to generate the second factor credential, including any neighboring IoT device 102 that is listed within each of the collections. As a result, IoT devices A and E are required to be used and the third IoT device 102 is selected from the set of {B, C, D, F, I, O and U}.

As a result, in step 402, authentication system 101 informs the IoT device 102 to be authenticated of the particular requirements in connection with generating the second factor credential. Consequently, IoT device 102 has knowledge as to which neighboring IoT devices 102 the IoT device 102 should obtain its identity credentials in order to generate the second factor credential. Such identity credentials from the required neighboring IoT devices 102 may be obtained during the neighbor observation period.

In step 403, authentication system 101 defines the "neighbor observation period" within which the IoT device 102 to be authenticated obtains the identity credentials from the required neighboring IoT devices used to generate the second factor credential. In one embodiment, the neighbor observation period includes a duration of time. In one embodiment, the neighbor observation period is defined to occur periodically, such as at specified intervals of time.

During this period of time, the IoT device 102 to be authenticated collects the identity credentials of its neighboring IoT devices 102, such as the identity credentials of its neighboring IoT devices 102 as required by authentication system 101.

Furthermore, in one embodiment, during this period of time, those neighboring IoT devices 102 transmit their identity credentials to authentication system 101 so that authentication system 101 will be able to determine the second factor credential to be received from the IoT device 102 to be authenticated. As previously discussed, such identity credentials may be stored in a table (which may reside in a storage device (e.g., memory 305, disk drive 308) or in database 104).

In step 404, authentication system 101 establishes a trust state in which the IoT device 102 (e.g., IoT device 102A) to be authenticated is paired with neighboring IoT devices, where the identity credentials of at least a subset of these neighboring IoT devices are used to generate the second factor credential. In one embodiment, once such IoT devices 102 are paired, they are to remain in constant communication. In one embodiment, such IoT devices 102 are installed during the trust state.

In one embodiment, during the trust state, the username and password 208 that IoT device 102 uses as the first factor credential may be provided to authentication system 101 to verify the accuracy of the first factor credential when IoT device 102 provides the first factor credential to authentication system 101. In one embodiment, such a username and password is stored in a table (which may reside in a storage device (e.g., memory 305, disk drive 308) or in database 104) along with an identifier of the associated IoT device 102 (e.g., object identifier, such as a barcode, communication identifier, such as an Internet Protocol (IP) address, and application identifier, such as a uniform resource identifier (URI) and uniform resource locator (URL)). By associating the username and password with the corresponding IoT device 102, authentication system 101 can identify the username and password associated with the IoT device 102 by performing a look-up in the table based on the identifier of the IoT device 102.

Upon completion of the setup phase, the execution phase in authenticating IoT device 102 (e.g., IoT device 102A) by IoT device 102 providing authentication system 101 a second factor credential using the required identity credentials of the neighboring IoT devices 102 is discussed below in connection with FIG. 5.

FIG. 5 is a flowchart of a method 500 of an execution phase in authenticating IoT device 102 (e.g., IoT device 102A) by IoT device 102 providing authentication system 101 a second factor credential using the identity credentials of the minimum number of required neighboring IoT devices 102 in accordance with an embodiment of the present disclosure.

Referring to FIG. 5, in conjunction with FIGS. 1-4, in step 501, IoT device 102 to be authenticated obtains the identity credentials from the required neighboring IoT devices 102 during the neighbor observation period which are used to generate the second factor credential as discussed above.

In step 502, IoT device 102 provides a request to authentication system 101 to prove an identity of IoT device 102. In one embodiment, the request is provided to authentication system 101 periodically. In one embodiment, the request is provided to authentication system 101 in response to a trigger event (e.g., event generated by the registry when an item is added, updated or deleted).

In step 503, IoT device 102 provides a first factor credential (e.g., username, password) to authentication system 101. In one embodiment, the username and password 208 are embedded in IoT device 102, such as being stored within storage device 202.

In one embodiment, authentication system 101, upon confirming the accuracy of the first factor credential, such as via a look-up in a table listing the username and passwords associated with IoT devices 102, challenges IoT device 102 to provide the second factor credential.

In step 504, IoT device 102 receives a challenge from authentication system 101 to provide a second factor credential.

In step 505, IoT device 102 returns the second factor credential to authentication system 101 that was generated based on the obtained identity credentials from the required neighboring IoT devices 102. For example, authentication system 101 may require the IoT device 102 (e.g., IoT device 102A) to be authenticated to use the identity credentials of IoT device 102B, IoT device 102C and IoT device 102D to generate the second factor credential that corresponds to the required minimum number of three neighboring IoT devices 102 that are required to be used to generate the second factor credential. As a result, the second factor credential includes the identity credentials of IoT device 102B, IoT device 102C and IoT device 102D, which is provided to authentication system 101.

In another example, as discussed above, authentication system 101 may require the IoT device 102 (e.g., IoT device 102A) to be authenticated to use the required minimum number of collections (e.g., three collections) that consists of the defined neighboring IoT devices 102. For instance, authentication system 101 may define the collection "R" to include the set of {A, B, C, D and E}, define the collection "S" to include the set of {A, B, E and F} and define the collection "T" to include the set of {A, E, I, O and U}, where each letter corresponds to a specific IoT device 102. The authentication requirement could be that at least 3 neighboring IoT devices 102 need to be used to generate the second factor credential, including any neighboring IoT device 102 that is listed within each of the collections. As a result, IoT devices A and E are required to be used and the third IoT device 102 is selected from the set of {B, C, D, F, I, O and U}. As a result, IoT device 102 acquires the identity credentials of IoT devices A and B as well as one selected from IoT devices C, D, E, F, I, O and U. The second factor credential is then generated with such identity credentials, which is provided to authentication system 101.

As discussed above, "generating" the second factor credential, as used herein, refers to producing a credential that includes the required identity credentials of the neighboring IoT devices 102. "Generating," may be performed by appending an identifier (e.g., object identifier, such as a barcode, communication identifier, such as an Internet Protocol (IP) address, and application identifier, such as a uniform resource identifier (URI) and uniform resource locator (URL)) of neighboring IoT device 102 with its identity credential. As a result, the second factor credential may include a series of identifiers (identifiers of neighboring IoT devices 102) appended with its associated identity credential.

In step 506, authentication system 101 receives the second factor credential from IoT device 102.

In step 507, a determination is made by authentication system 101 as whether the received second factor credential contains the minimum number of required identity credentials.

For example, if authentication system 101 requires the IoT device 102 (e.g., IoT device 102A) to be authenticated to use at least the identity credentials of IoT device 102B, IoT device 102C and IoT device 102D to generate the second factor credential, then as long as those identity credentials are included in the second factor credential, authentication system 101 will approve authentication; otherwise, authentication system 101 will not approve authentication.

As discussed above, if authentication system 101 requires the IoT device 102 (e.g., IoT device 102A) to be authenticated to collect the identity credentials of at least 3 neighboring IoT devices 102 that are members of each of the collections R, S and T (collection "R" includes the set of {A, B, C, D and E}, collection "S" includes the set of {A, B, E and F} and collection "T" includes the set of {A, E, I, O and U}), including any neighboring IoT device 102 that is listed within each of the collections. As a result, IoT devices A and E are required to be used and the third IoT device 102 is selected from the set of {B, C, D, F, I, O and U}. Hence, as long as the second factor credential includes the identity credentials of IoT devices A and E as well as the identity credential of an IoT device 102 selected from IoT devices C, D, E, F, I, O and U, then authentication system 101 will approve authentication; otherwise, authentication system 101 will not approve authentication.

If the received second factor credential contains the minimum number of required identity credentials, then, in step 508, authentication system 101 approves authentication and issues an indication to IoT device 102 that the authentication of IoT device 102 has been approved. In this manner, IoT device 102 is authenticated utilizing multi-factor authentication in a more secured manner than prior attempts. In one embodiment, as a result of being authenticated, authentication system 101 establishes a secure connection of IoT device 102 within IoT environment 100, such as between itself and another IoT device 102.

In step 509, IoT device 102 receives an indication from authentication system 101 that IoT device 102 has proved its identity. In one embodiment, such an indication may be in the form of an alert or a message. As discussed above, as a result of being authenticated, IoT device 102 has a secure connection within IoT environment 100, such as between itself and another IoT device 102. Consequently, the data stored in IoT device 102 may be allowed to be securely transmitted to another device within the secured system, such as another IoT device 102. That is, upon receiving such an indication, the data stored in IoT device 102 may become accessible to another device, such as another IoT device 102, within the secured IoT environment 100.

If, however, the received second factor credential does not contain the minimum number of required identity credentials, then, in step 510, authentication system 101 does not approve authentication and issues an indication to IoT device 102 that the authentication of IoT device 102 has not been approved.

In step 511, IoT device 102 receives an indication from authentication system 101 that IoT device 102 has not proved its identity. In one embodiment, such an indication may be in the form of an alert or a message. In one embodiment, upon receiving such an indication, the data stored in IoT device 102 may not be allowed to be transmitted to another device, such as another IoT device 102. That is, upon receiving such an indication, the data stored in IoT device 102 may not become accessible to another device, such as another IoT device 102.

As a result of the foregoing, embodiments of the present disclosure provide a means for improving the technology or technical field of information security by authenticating an IoT device utilizing multi-factor authentication in a more secured manner than prior attempts.

Furthermore, the present disclosure improves the technology or technical field involving information security. As discussed above, information security, sometimes shortened to infosec, is the practice of protecting information by mitigating information risks. For example, information security, which is part of information risk management, attempts to prevent or at least reduce the probability of unauthorized/inappropriate access to data, or the unlawful use, disclosure, disruption, deletion, corruption, modification, inspection, recording or devaluation of information. It also involves actions intended to reduce the adverse impacts of such incidents. One technique for providing information security is via multi-factor authentication, which is an electronic authentication method in which a computer user may be granted access to a website or application only after successfully presenting two or more pieces of evidence (or factors) to an authentication mechanism: knowledge (something the user and only the user knows), possession (something the user and only the user has), and inherence (something the user and only the user is). It protects the user from an unknown person trying to access their data, such as personal identifier details or financial assets. While multi-factor authentication has been used to protect information in terms of attempting to only grant access to a website or application by an authenticated computer user, there has not been any major development in protecting information stored among Internet of Things (IoT) devices. Typically, in order to authenticate or prove the identity of an IoT device, the IoT device simply uses the traditional username and password, which is a single factor and does not provide the level of security as multi-factor authentication. There have been, however, some recent developments in utilizing multi-factor authentication, to provide a greater level of security for the data stored on an IoT device. For example, the IoT device stores a secret key for generating a time-based password. An authenticated identification device may also have the same secret key. The IoT device establishes the secured connection with the identification device through the wireless network. Then the IoT device uses the secret key and a current access time to generate the time-based password, and receives a second time-based password from the identification device through the secured connection. If both time-based passwords match each other, the identification device is authenticated. This approach is a similar approach to that used by RSA key fobs to provide a second factor. Unfortunately, such an approach is susceptible to unauthorized manipulation of the time source within the IoT device. There is not currently a means for utilizing multi-factor authentication to authenticate an Internet of Things (IoT) device in a more secured manner than prior attempts.

Embodiments of the present disclosure improve such technology by obtaining the identity credentials of neighboring IoT device(s) by the IoT device to be authenticated. In one embodiment of the present disclosure, the identity credentials of neighboring IoT device(s) are obtained by the IoT device to be authenticated. Such identity credentials may be utilized to generate a second factor credential during a multi-factor authentication process. In one embodiment, during a trust state, such as when the IoT device and its neighboring IoT devices are installed, the authentication system pairs the IoT device with specified neighboring IoT devices to be in constant communication. The authentication system may require the second factor credential generated by the IoT device to be based on the identity credentials acquired from at least a minimum number of these neighboring IoT devices or acquired from specified IoT devices out of these neighboring IoT devices. In one embodiment, such identity credentials are obtained by the IoT device during a "neighbor observation period," which corresponds to a designated duration of time, which may occur periodically, such as at specified intervals of time. Upon providing a request to the authentication system to prove its identity, the IoT devices provides the authentication system a first factor credential, such as a username and password, which may be embedded within the IoT device. The authentication system, upon confirming the accuracy of the first factor credential, such as via a lookup table listing the username and passwords associated with the IoT device, challenges the IoT to provide the second factor credential. After receiving the challenge from the authentication system to provide the second factor credential, the IoT device returns the second factor credential to the authentication system that was generated based upon the obtained identity credentials from the neighboring IoT device(s). Upon determining that the received second factor credential includes the identity credentials of specified neighboring IoT devices or a minimum number of specified neighboring IoT devices, the authentication system approves authentication. The IoT device then receives an indication from the authentication system that the IoT device has proved its identity. In this manner, the IoT device is authenticated utilizing multi-factor authentication in a more secured manner than prior attempts. Furthermore, in this manner, there is an improvement in the technical field involving information security.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for utilizing multi-factor authentication to authenticate an Internet of Things (IoT) device, the method comprising:
   obtaining identity credentials from one or more other IoT devices by said IoT device during a period of time to generate a second factor credential;
   providing a request to an authentication system to prove an identity of said IoT device;
   providing a first factor credential to said authentication system;
   receiving a challenge from said authentication system to provide said second factor credential;
   returning said second factor credential generated based on said obtained identified credentials from said one or more other IoT devices; and
   receiving an indication from said authentication system that said IoT device has proved said identity of said IoT device in response to said second factor credential containing a minimum number of required identity credentials.

2. The method as recited in claim 1, wherein said identity credentials comprise a security key, a digital signature or characteristics of said one or more other IoT devices, wherein said characteristics comprise one or more of the following: sensor characteristics, strength of signal characteristics, signal modulation characteristics and signal encoding characteristics.

3. The method as recited in claim 1, wherein said request to said authentication system to prove said identity of said IoT device is performed periodically or in response to a trigger event.

4. The method as recited in claim 1 further comprising:
   defining a minimum number of required IoT devices to be used to generate said second factor credential or defining a minimum number of required collections to be used to generate said second factor credential, wherein each of said collections comprises a set of identified IoT devices.

5. The method as recited in claim 4 further comprising:
   defining an identity of required IoT devices corresponding to said minimum number of required IoT devices to be used to generate said second factor credential or defining an identity of required IoT devices within said required minimum number of collections to be used to generate said second factor credential.

6. The method as recited in claim 5 further comprising:
   defining an observation period within which said IoT device obtains identity credentials from said required IoT devices corresponding to said minimum number of required IoT devices to be used to generate said second factor credential or obtains identity credentials from said required IoT devices within said required minimum number of collections to be used to generate said second factor credential.

7. The method as recited in claim 1 further comprising:
   establishing a trust state in which said IoT device is paired with said one or more other IoT devices, wherein said IoT device is in constant communication with said one or more other IoT devices.

8. A computer program product for utilizing multi-factor authentication to authenticate an Internet of Things (IoT) device, the computer program product comprising one or more computer readable storage mediums having program code embodied therewith, the program code comprising programming instructions for:
    obtaining identity credentials from one or more other IoT devices by said IoT device during a period of time to generate a second factor credential;
    providing a request to an authentication system to prove an identity of said IoT device;
    providing a first factor credential to said authentication system;
    receiving a challenge from said authentication system to provide said second factor credential;
    returning said second factor credential generated based on said obtained identified credentials from said one or more other IoT devices; and
    receiving an indication from said authentication system that said IoT device has proved said identity of said IoT device in response to said second factor credential containing a minimum number of required identity credentials.

9. The computer program product as recited in claim 8, wherein said identity credentials comprise a security key, a digital signature or characteristics of said one or more other IoT devices, wherein said characteristics comprise one or more of the following: sensor characteristics, strength of signal characteristics, signal modulation characteristics and signal encoding characteristics.

10. The computer program product as recited in claim 8, wherein said request to said authentication system to prove said identity of said IoT device is performed periodically or in response to a trigger event.

11. The computer program product as recited in claim 8, wherein a minimum number of required IoT devices to be used to generate said second factor credential is defined or a minimum number of required collections to be used to generate said second factor credential is defined, wherein each of said collections comprises a set of identified IoT devices.

12. The computer program product as recited in claim 11, wherein an identity of required IoT devices corresponding to said minimum number of required IoT devices to be used to generate said second factor credential is defined or an identity of required IoT devices within said required minimum number of collections to be used to generate said second factor credential is defined.

13. The computer program product as recited in claim 12, wherein an observation period is defined within which said IoT device obtains identity credentials from said required IoT devices corresponding to said minimum number of required IoT devices to be used to generate said second factor credential or obtains identity credentials from said required IoT devices within said required minimum number of collections to be used to generate said second factor credential.

14. The computer program product as recited in claim 8, wherein a trust state is established in which said IoT device is paired with said one or more other IoT devices, wherein said IoT device is in constant communication with said one or more other IoT devices.

15. An Internet of Things (IoT) device, comprising:
    a memory for storing a computer program for utilizing multi-factor authentication to authenticate said IoT device; and
    a processor connected to said memory, wherein said processor is configured to execute program instructions of the computer program comprising:
        obtaining identity credentials from one or more other IoT devices by said IoT device during a period of time to generate a second factor credential;
        providing a request to an authentication system to prove an identity of said IoT device;
        providing a first factor credential to said authentication system;
        receiving a challenge from said authentication system to provide said second factor credential;
        returning said second factor credential generated based on said obtained identified credentials from said one or more other IoT devices; and
        receiving an indication from said authentication system that said IoT device has proved said identity of said IoT device in response to said second factor credential containing a minimum number of required identity credentials.

16. The IoT device as recited in claim 15, wherein said identity credentials comprise a security key, a digital signature or characteristics of said one or more other IoT devices, wherein said characteristics comprise one or more of the following: sensor characteristics, strength of signal characteristics, signal modulation characteristics and signal encoding characteristics.

17. The IoT device as recited in claim 15, wherein said request to said authentication system to prove said identity of said IoT device is performed periodically or in response to a trigger event.

18. The IoT device as recited in claim 15, wherein a minimum number of required IoT devices to be used to generate said second factor credential is defined or a minimum number of required collections to be used to generate said second factor credential is defined, wherein each of said collections comprises a set of identified IoT devices.

19. The IoT device as recited in claim 18, wherein an identity of required IoT devices corresponding to said minimum number of required IoT devices to be used to generate said second factor credential is defined or an identity of required IoT devices within said required minimum number of collections to be used to generate said second factor credential is defined.

20. The IoT device as recited in claim 19, wherein an observation period is defined within which said IoT device obtains identity credentials from said required IoT devices corresponding to said minimum number of required IoT devices to be used to generate said second factor credential or obtains identity credentials from said required IoT devices within said required minimum number of collections to be used to generate said second factor credential.

* * * * *